United States Patent
Li et al.

(10) Patent No.: US 10,620,870 B2
(45) Date of Patent: Apr. 14, 2020

(54) DATA STORAGE DEVICE WITH BYTEWISE COPY

(71) Applicant: Intel Corporation, Santa Clara, CA (US)

(72) Inventors: Peng Li, Beaverton, OR (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 15/836,704

(22) Filed: Dec. 8, 2017

(65) Prior Publication Data
US 2019/0034088 A1 Jan. 31, 2019

(51) Int. Cl.
*G06F 12/00* (2006.01)
*G06F 3/06* (2006.01)
(Continued)

(52) U.S. Cl.
CPC .............. *G06F 3/065* (2013.01); *G06F 3/068* (2013.01); *G06F 3/0619* (2013.01);
(Continued)

(58) Field of Classification Search
CPC ...... G06F 3/065; G06F 3/0619; G06F 3/0679; G06F 3/068; G06F 12/10; G06F 13/28;
(Continued)

(56) References Cited

U.S. PATENT DOCUMENTS

| 5,195,100 A | 3/1993 | Katz et al. |
| 5,889,968 A | 3/1999 | Bennett et al. |

(Continued)

FOREIGN PATENT DOCUMENTS

| EP | 1396792 B1 | 6/2005 |
| WO | 2011059638 A2 | 5/2011 |

OTHER PUBLICATIONS

Lu, L., et al., "WiscKey: Separating Keys from Values in SSD-conscious Storage," Proceedings of the 14th USENIX Conference on File and Storage Technologies (FAST'16). Feb. 22-25, 2016, Santa Clara, CA, USA, pp. 133-148; ISBN 978-1-931971-28-7.

(Continued)

*Primary Examiner* — Mardochee Chery
(74) *Attorney, Agent, or Firm* — Schwabe, Williamson & Wyatt, P.C.

(57) ABSTRACT

Embodiments of the present disclosure may relate to a data storage controller that may include a host interface to receive a request from a host to perform a data copy operation on a non-volatile data storage component of a data storage device, where the request identifies one or more source ranges of the non-volatile data storage component from which data is to be copied, a destination range of the non-volatile data storage component to which the data is to be copied, and a transfer length in bytes for each of the one or more source ranges, and a processor coupled with the host interface to process the request from the host to perform the data copy operation to copy the data from the one or more source ranges to the destination range based at least in part on the transfer length in bytes. Other embodiments may be described and/or claimed.

21 Claims, 6 Drawing Sheets

(51) Int. Cl.
*G06F 12/10* (2016.01)
*G06F 13/28* (2006.01)
*G06F 12/02* (2006.01)
*G06F 12/0868* (2016.01)
*G06F 12/0804* (2016.01)

(52) U.S. Cl.
CPC ........ *G06F 3/0679* (2013.01); *G06F 12/0238* (2013.01); *G06F 12/0868* (2013.01); *G06F 12/10* (2013.01); *G06F 13/28* (2013.01); *G06F 12/0804* (2013.01); *G06F 2212/1032* (2013.01); *G06F 2212/202* (2013.01); *G06F 2212/205* (2013.01); *G06F 2212/217* (2013.01); *G06F 2212/2515* (2013.01); *G06F 2212/313* (2013.01); *G06F 2212/7201* (2013.01); *G06F 2212/7202* (2013.01)

(58) Field of Classification Search
CPC ......... G06F 12/0804; G06F 2212/1032; G06F 2212/202; G06F 2212/205; G06F 2212/217; G06F 2212/2515; G06F 2212/313; G06F 2212/7201; G06F 2212/7202; G06F 12/0238; G06F 12/0868
USPC ....................................................... 711/103
See application file for complete search history.

(56) References Cited

U.S. PATENT DOCUMENTS

| | | | |
|---|---|---|---|
| 5,996,046 A * | 11/1999 | Yagisawa | G06F 11/1076 711/112 |
| 7,174,416 B2 | 2/2007 | Hasbun et al. | |
| 8,032,787 B2 | 10/2011 | Atri et al. | |
| 8,127,104 B1 | 2/2012 | Han Sehn | |
| 8,316,201 B2 | 11/2012 | Stern et al. | |
| 8,316,257 B2 | 11/2012 | Royer et al. | |
| 8,464,132 B2 | 6/2013 | Chen et al. | |
| 8,812,817 B2 | 8/2014 | Fuller et al. | |
| 9,047,172 B2 | 6/2015 | Burke et al. | |
| 9,417,998 B2 | 8/2016 | Mylly et al. | |
| 9,774,677 B2 | 9/2017 | Hefty | |
| 2004/0049649 A1 | 3/2004 | Durrant | |
| 2004/0177130 A1* | 9/2004 | Chambliss | H04L 29/06 709/219 |
| 2005/0210322 A1 | 9/2005 | Corrado | |
| 2007/0083697 A1 | 4/2007 | Birrell et al. | |
| 2008/0082736 A1 | 4/2008 | Chow et al. | |
| 2009/0158085 A1 | 6/2009 | Kern et al. | |
| 2009/0172466 A1 | 7/2009 | Royer et al. | |
| 2009/0327759 A1 | 12/2009 | Royer et al. | |
| 2010/0161932 A1 | 6/2010 | Stern et al. | |
| 2012/0005557 A1 | 1/2012 | Mardiks et al. | |
| 2014/0068216 A1 | 3/2014 | Chung | |
| 2016/0070336 A1 | 3/2016 | Kojima et al. | |
| 2017/0177243 A1 | 6/2017 | Trika | |

OTHER PUBLICATIONS

Final Office Action dated Jul. 9, 2018, issued in U.S. Appl. No. 14/975,150, 10 pages.
Notice of Allowance dated Oct. 2, 2018, issued in U.S. Appl. No. 14/975,150, 6 pages.
International Search Report and Written Opinion for PCT application PCT/US2016/062796, dated Feb. 27, 2017, 7 pages.
Non-Final Office Action dated Nov. 29, 2017, issued in U.S. Appl. No. 14/975,150, 10 pages.
Non-Final Office Action dated Jun. 15, 2017, issued in U.S. Appl. No. 14/975,150, 11 pages.

\* cited by examiner

DATA STORAGE DEVICE WITH BYTEWISE COPY

FIELD

Embodiments of the present disclosure generally relate to the field of computer data storage devices and, more particularly, to devices and techniques for copying data in data storage devices.

BACKGROUND

Typically, legacy data copy approaches require transfers of data between a storage device and a host. This results in degraded performance for key-value systems that move significant amounts of data during compaction operations. Although some legacy approaches provide for on-device copy operations, these legacy approaches support copy operations at a sector granularity level and do not provide significant performance advantages for situations where copy operations are unaligned with a sector boundary.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure may relate to a data storage device that may include a non-volatile data storage component, a volatile memory, and a data storage controller. In some embodiments, the data storage controller may receive a request to perform a data copy operation on the non-volatile data storage component, where the request identifies one or more source ranges of the non-volatile data storage component from which data is to be copied, a destination range of the non-volatile data storage component to which the data is to be copied, and a transfer length in bytes for each of the one or more source ranges. In various embodiments, the data storage controller may perform the data copy operation to copy the data from the one or more source ranges to the destination range.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
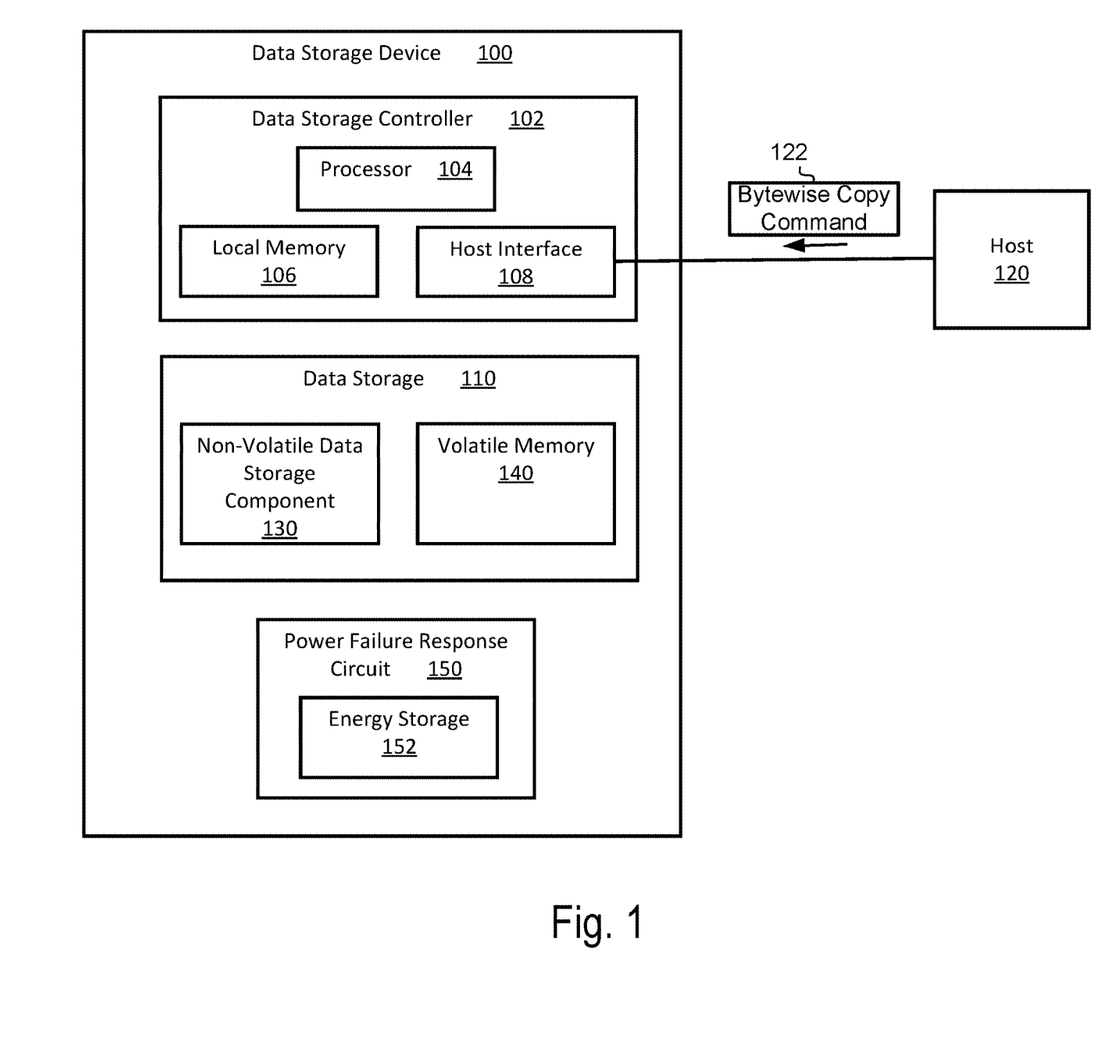
FIG. 1 depicts a block diagram of a data storage device for performing a data copy operation, in accordance with various embodiments.

FIG. 1 depicts a block diagram of a data storage device 100 for performing a data copy operation requested by a host 120, in accordance with various embodiments. In some embodiments, the data storage device 100 may include a data storage controller 102 and a data storage 110, which may include a non-volatile data storage component 130 (e.g., non-volatile memory (NVM)) and volatile memory 140, in accordance with various embodiments. The data storage controller 102 of the data storage device 100 may be embodied as any type of control device, circuitry, or collection of hardware devices capable of performing a data copy operation on the non-volatile data storage component 130. In some embodiments, the data storage controller 102 may include a processor or processing circuitry 104, local memory 106, and a host interface 108. In some embodiments, the host 120 may be communicatively coupled with the data storage controller 102 of the data storage device 100 via the host interface 108. In various embodiments, the data storage controller 102 may include additional devices, circuits, and/or components commonly found in a drive controller of a data storage device such as a solid state drive (SSD).

In some embodiments, in use, the data storage controller 102 may perform a data copy operation requested by the host 120 in the background, allowing the host 120 to perform other tasks. In various embodiments, the request to perform the data copy operation may be issued as a bytewise copy command 122 from the host 120 to the data storage device 100 via the host interface 108. In some embodiments, the data storage controller 102 may promptly notify the host 120 that the requested data copy operation has been completed prior to actually completing the data copy operation.

In various embodiments, the request from the host 120 to perform the data copy operation may be in the form of a command. In some embodiments, the command may be a byte granularity, bytewise copy command (e.g., bytewise copy command 122) that may direct the storage device 100 to copy data at a scatter-gather list of source byte ranges on the data storage device 100 to a destination location on the data storage device 100. In some embodiments, the command may specify one or multiple source ranges that may include a start logical block address (LBA) and a byte offset, a transfer length in bytes for each source range, and a destination range that may include a start LBA and byte offset. In some embodiments, the destination may be a scatter-gather set of byte ranges rather than a single contiguous range. In various embodiments, the copy command may be a vendor specific command or a standardized command. In some embodiments, the command may be referred to as Byte-SG-Copy, with SG referring to a scatter-gather list of source byte ranges. In some embodiments, the data storage device 100 (e.g., a SSD) may reserve two regions in volatile memory 140 (e.g., DRAM or SRAM) for the command. In various embodiments, one of the reserved regions may be for source data and the other may be for destination data. In some embodiments, the base address and the size of the two regions may be configurable.

In various embodiments, to ensure that the data copy operation is completed properly, the data storage controller 102 may generate a copy token that identifies the source and destination locations and store the copy token in a power-fail-safe data structure, which may be automatically saved to the non-volatile data storage component 130 should the data storage device 100 lose power during the performance of the data copy operation. Additionally, the data storage controller 102 may mark the source and destination locations of the non-volatile data storage component 130 (e.g., source and destination address(es)) in a suitable table, such as a logical-to-physical address table, to indicate that those locations are involved in or otherwise affected by the data copy operation. Should a power failure or other harmful event occur that interrupts the copy operation, the data storage controller 102 may reinitiate or otherwise complete the data copy operation upon successful power up. In this way, the data storage controller 102 may be able to immediately "complete" the requested copy operation from the perspective of the requesting host 120, while providing some assurance that the copy operation will actually be completed at a later time (e.g., even in the event of a power failure).

The data storage device 100 may be embodied as any type of device capable of storing data and performing the functions described herein. In some embodiments, the data storage device 100 may be embodied as a solid state drive (SSD). In other embodiments, the data storage device 100 may embodied as a hard disk drive, a memory module device, a cache memory device, and/or other data storage device.

The processor 104 may be embodied as any type of processor capable of performing the functions described herein. For example, the processor 104 may be embodied as a single or multi-core processor(s), digital signal processor, microcontroller, or other processor or processing/controlling circuit. Similarly, the local memory 106 may be embodied as any type of volatile and/or non-volatile memory or data storage capable of performing the functions described herein. In some embodiments, the local memory 106 may store firmware and/or other instructions executable by the processor 104 to perform the described functions of the data storage controller 102. In some embodiments, the processor 104 and the local memory 106 may form a portion of a System-on-a-Chip (SoC) and be incorporated, along with other components of the data storage controller 102, onto a single integrated circuit chip.

The host interface 108 may also be embodied as any type of hardware processor, processing circuitry, input/output circuitry, and/or collection of components capable of facilitating communication of the data storage device 100 with a host device (e.g., host 120) or service (e.g., a host application). That is, the host interface 108 may embody or establish an interface for accessing data stored on the data storage device 100 (e.g., stored in the data storage 110). In various embodiments, the host interface 108 may be configured to utilize any suitable communication protocol and/or technology to facilitate communications with the data storage device 100 depending on the type of data storage device. In some embodiments, the host interface 108 may be configured to communicate with a host device or service using Serial Advanced Technology Attachment (SATA), Peripheral Component Interconnect express (PCIe), Serial Attached SCSI (SAS), Universal Serial Bus (USB), and/or other communication protocol and/or technology.

In various embodiments, the non-volatile data storage component 130 may be embodied as any type of data storage capable of storing data in a persistent manner. For example, in the some embodiments, the non-volatile data storage component 130 may be embodied as non-volatile memory (NVM) and may be referred to herein as non-volatile memory 130 with the understanding that the non-volatile data storage component 130 may be embodied as other types of persistent data storage, such as hard disk platters, in other embodiments. In some embodiments, the non-volatile data storage component 130 may be a block-based memory. The non-volatile memory 130 may be embodied as NAND flash memory, NOR flash memory, phase change memory (PCM), electrically erasable programmable read-only memory (EEPROM), resistive memory, nanowire memory, three-dimensional cross point memory arrays, ferro-electric transistor random access memory (FeTRAM), magnetoresistive random access memory (MRAM), spin transfer torque MRAM, and/or other non-volatile memory.

The volatile memory 140 may be embodied as any type of memory capable of storing data while the data storage device 100 is in operation. For example, the volatile memory 140 may be embodied as dynamic random access memory (DRAM), static random access memory (SRAM), or other type of volatile memory in various embodiments.

In some embodiments, a command to perform a data copy operation may involve a small number of source and/or destination ranges. For a single source and destination range, the command may have parameters that may include a source range that may include a source start LBA and byte offset, a destination range that may include a destination start LBA and byte offset, and a transfer length in bytes. In various embodiments, the command may be extended to support N ranges if N is relatively small (e.g., less than or equal to approximately 4), by specifying N sets of such parameters. In various embodiments, the number of source ranges and the number of destination ranges may be different (e.g., as described with respect to FIG. 4).

In some embodiments, a command to perform a data copy operation may involve multiple source and/or destination ranges. In various embodiments, the command may specify multiple source and/or destination ranges to the data storage device 100 via a host memory buffer (HMB) (e.g., in host DRAM), or via a data storage device internal memory buffer (IMB) (e.g., in volatile memory 140). In some embodiments, the multiple source and/or destination ranges may be specified as two independent arrays of elements. In some embodiments, each element of each array may include a start LBA, a byte offset in the start LBA, and a number of bytes in the range. In some embodiments, the number of bytes in the range may be an optional parameter in the destination range if there is a single destination range. In some embodiments, the destination range array may follow the source range array in the memory buffer. In various embodiments, the command to perform the data copy operation may include the following parameters: an address and/or offset in a buffer (e.g., HMB or IMB) that contains the multiple source ranges, a number of source ranges, and a number of destination ranges.

In some embodiments, the data storage device 100 may also include a power fail response circuit 150, which may be configured to provide backup power to certain components of the data storage device 100 for a period of time in the event that power to the data storage device 100 is unexpectedly lost or interrupted. To do so, the power fail response circuit 150 may include an energy storage 152, which may be embodied as any type of energy storage device or devices capable of providing power to components of the data storage device 100 for a period of time. In some embodiments, the energy storage 152 may be embodied as a bank of capacitors, which may be charged during operation and from which energy can be extracted in the event of a power interruption. In other embodiments, the energy storage 152 may be embodied as, or otherwise include, other types of energy storage devices such as backup batteries.

While the description herein with respect to some embodiments is written in the context of a NAND based SSD, it should be understood that the concepts may apply to all block-based storage subsystems (e.g., Direct-Access SSDs, hard disk drives (HDDs), redundant array of independent disks (RAID)-Arrays, 3-D crosspoint (3DXP) based SSDs, network attached storage (NAS) and storage area network (SAN) devices.) The concepts may also readily be extended to data-movement across storage devices/sub-systems in some embodiments.

Figure 2:
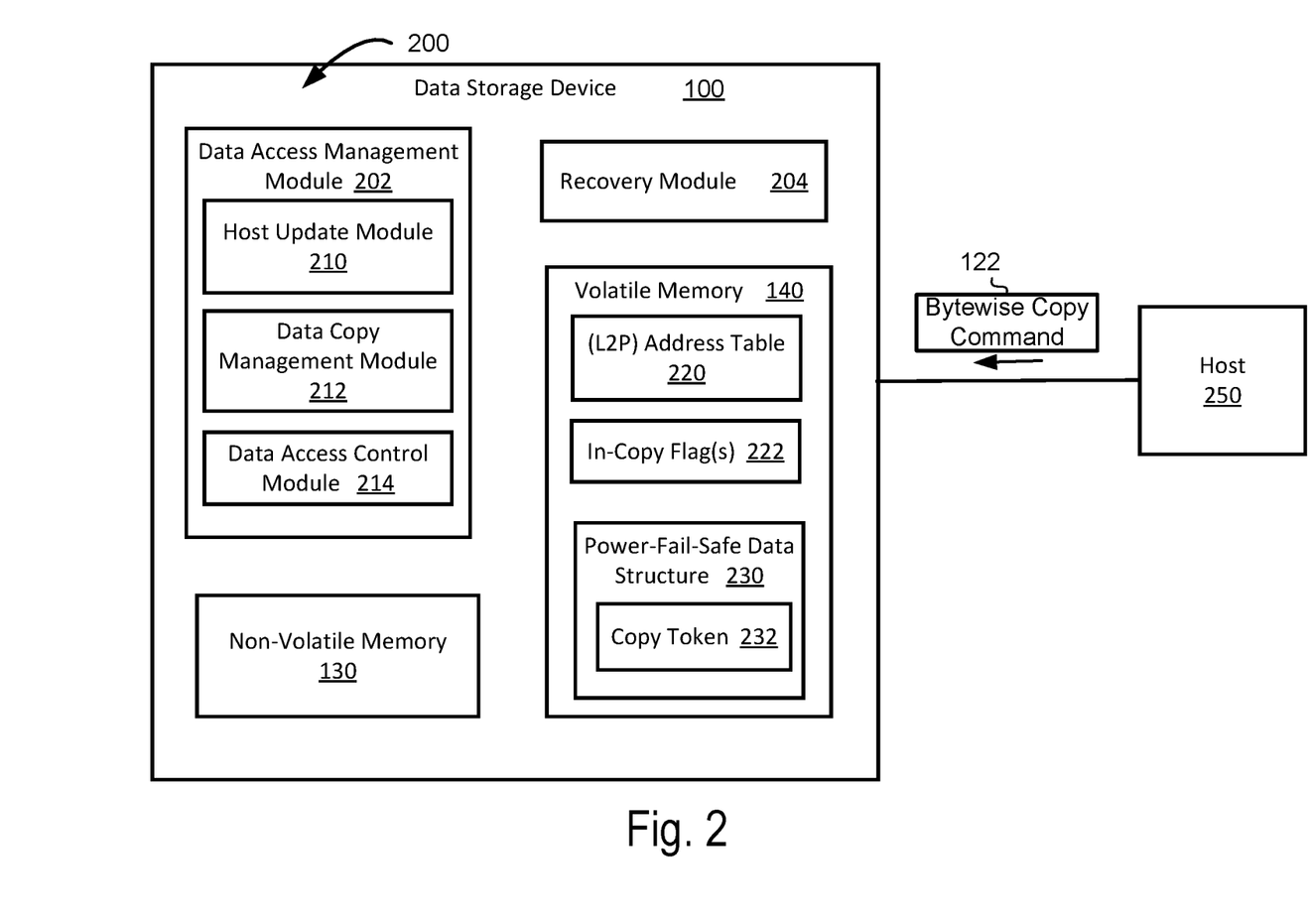
FIG. 2 is a block diagram of an environment that may be established by the data storage device of FIG. 1, in accordance with various embodiments.

FIG. 2 is a block diagram of an environment 200 that may be established by the data storage device 100, in accordance with various embodiments. In some embodiments, the environment 200 may include a data access management module 202 and a recovery module 204. Each of the modules and/or other components of the environment 200 may be embodied as firmware, software, hardware, or a combination thereof. In some embodiments, the various modules, logic, and other components of the environment 200 may form a portion of, or otherwise be established by, the data storage controller 102 or other hardware components of the data storage device 100. As such, in some embodiments, any one or more of the modules of the environment 200 may be embodied as a circuit or collection of electrical devices (e.g., a data access management circuit 202, a recovery circuit 204, etc.).

In some embodiments, the data access management module 202 may handle data access requests received from a host 250, which may be embodied as an application, service, and/or other device. In some embodiments, the host 250 may be, be a part of, or include a key-value (KV) database system. In some embodiments, the data access management module 202 may include a host update module 210 configured to notify the host 250 that the requested data copy operation has been completed prior to completion of the data copy operation by the data storage device 100. In some embodiments, the host update module 210 may immediately or otherwise promptly notify the host 250 of completion of the requested data copy operation upon receiving the request from the host 250. As such, the host 250 may proceed with performing other tasks while the data storage device 100 actually completes the requested data copy. In this way, the performance of the host 250 may be improved. In some embodiments, the host 250 and the host 120 may be the same and/or may be configured in a similar manner.

The data access management module 202 may also include a data copy management module 212 to perform the requested data copy operation (e.g., bytewise copy command 122). To do so, the data copy management module 212 may generate a copy token 232 and may store the copy token 232 in a power-fail-safe data structure 230, which may be stored in the volatile memory 140 during operation of the data storage device 100. As discussed above, the copy token 232 may identify the source location from which the data is to be copied, a transfer length in bytes, and the destination location to which the data is to be copied. For example, the copy token 232 may identify the source address or range of addresses of the non-volatile memory 130 and the destination address or range of addresses of the non-volatile memory 130.

As discussed above, in the case of a power failure event, the data storage device 100 may move the power-fail-safe data structure 230 from the volatile memory 140 to the non-volatile memory 130 in some embodiments. To do so, the power fail response circuit 150 may provide enough power to the suitable components of the data storage device 100 to effect the transfer of the power-fail-safe data structure 230 to the non-volatile memory 130.

In addition to generating and storing the copy token 232, the data copy management module 212 may mark or flag the source and destination locations in a suitable address table 220. In some embodiments, the address table 220 may be embodied as a logical-to-physical address table 220 that maps the logical addresses of the non-volatile memory 130 to physical addresses of the non-volatile memory 130. In some embodiments, the data copy management module 212 may mark the source address or range of addresses and the destination address or range of addresses by setting one or more in-copy flags 222 associated with the source and destination addresses. In other embodiments, the address table 220 may be embodied as any suitable data structure used to identify the source and destination locations affected by the copy operation, and in such embodiments, the data copy management module 212 may utilize any suitable method for marking or identifying the source and destination locations/addresses in such table.

In some embodiments, after the data copy management module 212 generates the copy token 232 and sets the in-copy flag(s) 222, the data copy management module 212 may complete the data copy operation by copying data from the source location to the destination location. Once the copy operation completes successfully, the data copy management module 212 may delete the associated copy token 232 and may remove and/or unset the associated in-copy flag(s) 222 in some embodiments.

In some embodiments, the data access management module 202 may also include a data access control module 214. In such embodiments, the data access control module 214 may control access to various regions of the non-volatile memory 130. In some embodiments, the data access control module 212 may block access requests (e.g., read or write requests) to the source and destination addresses or range of addresses associated with the data copy operation as identified by the in-copy flags 222. In some embodiments, the data access control module 214 may monitor a location containing the in-copy flags 222 and may block accesses to those addresses identified by the in-copy flags 222.

In some embodiments, the recovery module 204 may reinstate or otherwise complete a data copy operation that was interrupted due to a power failure event or other event that halted the data copy operation. To do so, upon power up or recovery from the event, the recovery module 204 may determine whether copy token 232 is present in the power-fail-safe data structure 230, which may be stored in the non-volatile memory 130 in response to the power failure event. If the copy token 232 is present, the recovery module 204 may notify the data copy management module 212 to complete the data copy operation as discussed above.

In various embodiments, the data storage device 100 may provide one or more performance advantages over legacy approaches, particularly for hosts that use copy operations that are unaligned with sector boundaries. For KV systems, KV pairs have variable length with byte level granularity and are typically saved without gaps on non-volatile data storage (e.g., NAND). This results in most of the required copy operations performed by such systems being unaligned with a sector boundary and unamenable to legacy sector-based copy operations where sector granularity is typically 512 bytes. In various embodiments, the data storage device 100, the data storage controller 102, and/or the environment 200 provide for byte level granularity on-SSD copy operations that may provide performance advantages over legacy techniques.

Figure 3:
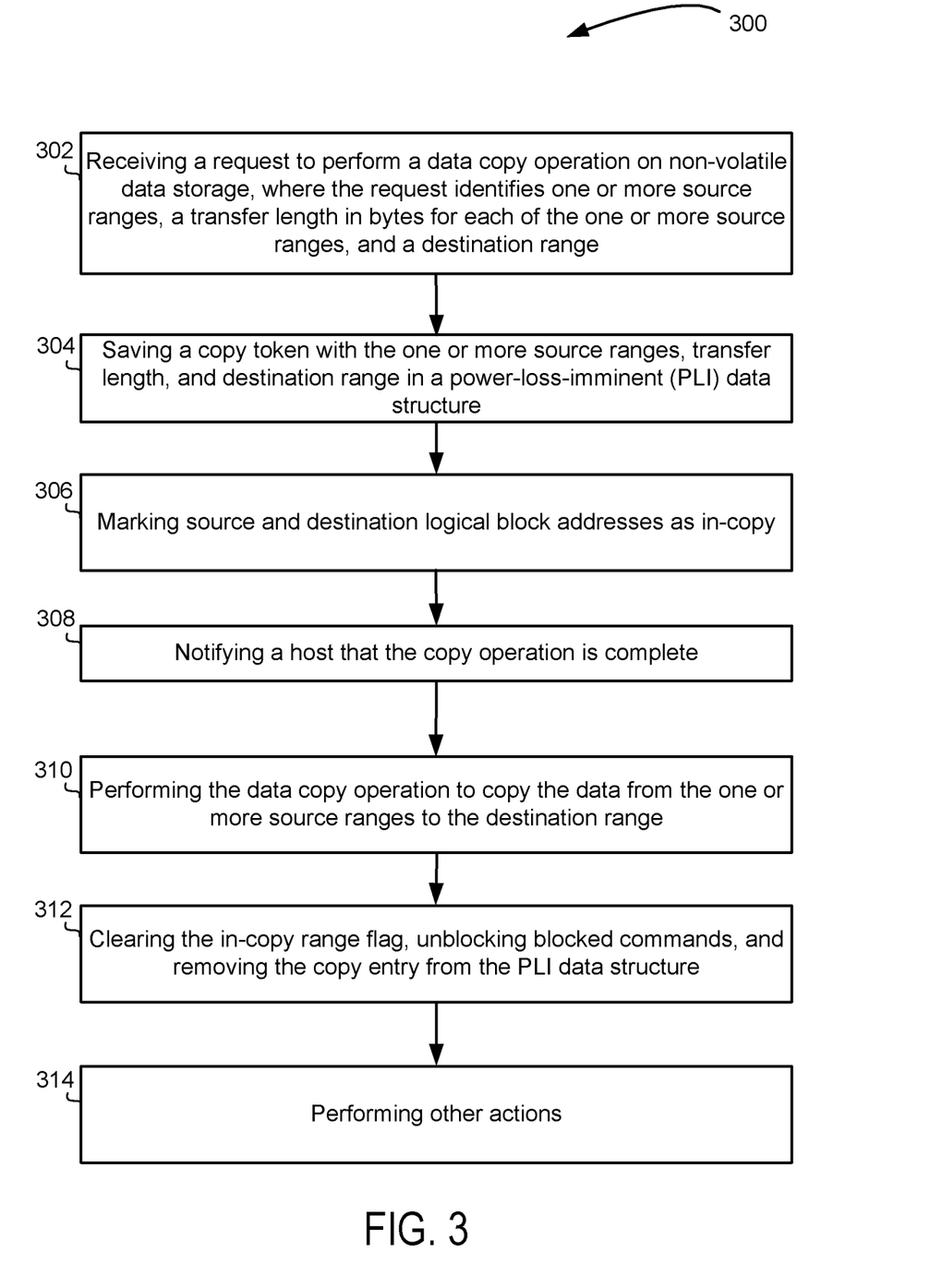
FIG. 3 is a flow diagram of a technique for performing a data copy operation with a data storage device, in accordance with various embodiments.

FIG. 3 is a flow diagram of a technique 300 for performing a data copy operation with a data storage device (e.g., data storage device 100), in accordance with various embodiments. In some embodiments, some or all of the technique 300 may be practiced by components shown and/or described with respect to the data storage device 100 of FIG. 1, the environment 200 of FIG. 2, the computing device 500 of FIG. 5, or some other component described with respect to FIGS. 1-2 and/or FIGS. 5-6.

In various embodiments, at a block 302, the technique 300 may include receiving a request to perform a data copy operation on non-volatile data storage (e.g., from host 250), where the request identifies one or more source ranges, a transfer length in bytes for each of the one or more source ranges, and a destination range. In some embodiments, the request may include a start LBA and a byte offset for each source range and each destination range. In various embodiments, the request may be a command and/or may specify more than one destination range. In some embodiments, the request may include an address of a memory buffer that contains an array specifying the source ranges and destination ranges.

In some embodiments, at a block 304, the technique 300 may include saving a copy token with the parameters in the request (e.g., one or more source ranges, transfer length(s) in bytes, destination range) in a power-loss-imminent (PLI) data structure (e.g., power-fail-safe data structure 230). In some embodiments, the copy token (e.g., copy token 232) may be saved to non-volatile media only if there is a PLI signal while there are copies in progress.

In various embodiments, at a block 306, the technique 300 may include marking the source and destination logical block addresses (LBAs) as in-copy (e.g., with data copy management module 212). In some embodiments, marking the source and destination LBAs as in-copy may include blocking and/or delaying all input/output operations that access the destination LBAs until the lock is released (e.g., by data access control module 214), and/or may include blocking and/or delaying all writes that access the source LBAs until the lock is released. In some embodiments, at a block 308, the technique 300 may include notifying a host that the copy operation is complete.

In various embodiments, at a block 310, the technique 300 may include performing the data copy operation to copy the data from the one or more source ranges to the destination range (e.g., by data storage controller 102 and/or data copy management module 212). In some embodiments, the data copy operation may be performed in the background. In various embodiments, performing the data copy operation may include converting an LBA and byte offset from the first source range into a source indirection unit's (IU's) range, which is aligned with an IU-size boundary in a first operation. Performing the data copy operation may further include performing an internal direct memory access (DMA) transfer of the source IU(s) from non-volatile storage (e.g., non-volatile memory 130 that may be NAND based in some embodiments) to a source region in volatile memory (e.g., volatile memory 140 that may be DRAM in some embodiments) in a second operation. In various embodiments, performing the data copy operation may include converting an LBA and byte offset from the destination range into a destination IU's range which is aligned with an IU-size boundary (e.g., 4 kibibyte (KiB) boundary) in a third operation. In some embodiments, if needed, performing the data copy operation may include performing an internal DMA transfer of the destination IU(s) from non-volatile storage (e.g., NAND) to a destination region in volatile memory (e.g., DRAM) in a fourth operation. In various embodiments, this DMA transfer may be needed for select destination sectors if the destination range(s) have gaps in those sectors and may effectively provide a read-modify-write capability for the destination sectors that leaves the gaps unmodified. In some embodiments, if the destination range(s) do not have gaps and there is a zero offset, the internal DMA transfer of the destination IU(s) may not be performed. In various embodiments, performing the data copy operation may include performing a memory copy of the data using the byte offset and lengths from the source volatile memory region (e.g., in volatile memory 140) to the respective destination volatile memory region in a fifth operation. In embodiments, performing the data copy operation may include performing an internal DMA transfer of the destination IU(s) from the destination volatile memory region (e.g., in volatile memory 140) to the non-volatile memory (e.g., non-volatile memory 130) in a sixth operation. In some embodiments, the first through sixth operations discussed above may be performed for each source range until all source ranges are processed.

In some embodiments, at a block 312, the technique 300 may include clearing the in-copy range flag set at the block 306, unblocking any commands blocked and/or delayed at the block 306, and/or removing the copy token entry from the PLI data structure saved at the block 304. In various embodiments, at a block 314, the technique 300 may include performing other actions. In some embodiments, in case of a power failure or other device interruption, the copy operations may be resumed when a pending copy token is discovered as part of saved PLI information during replay.

Figure 4:
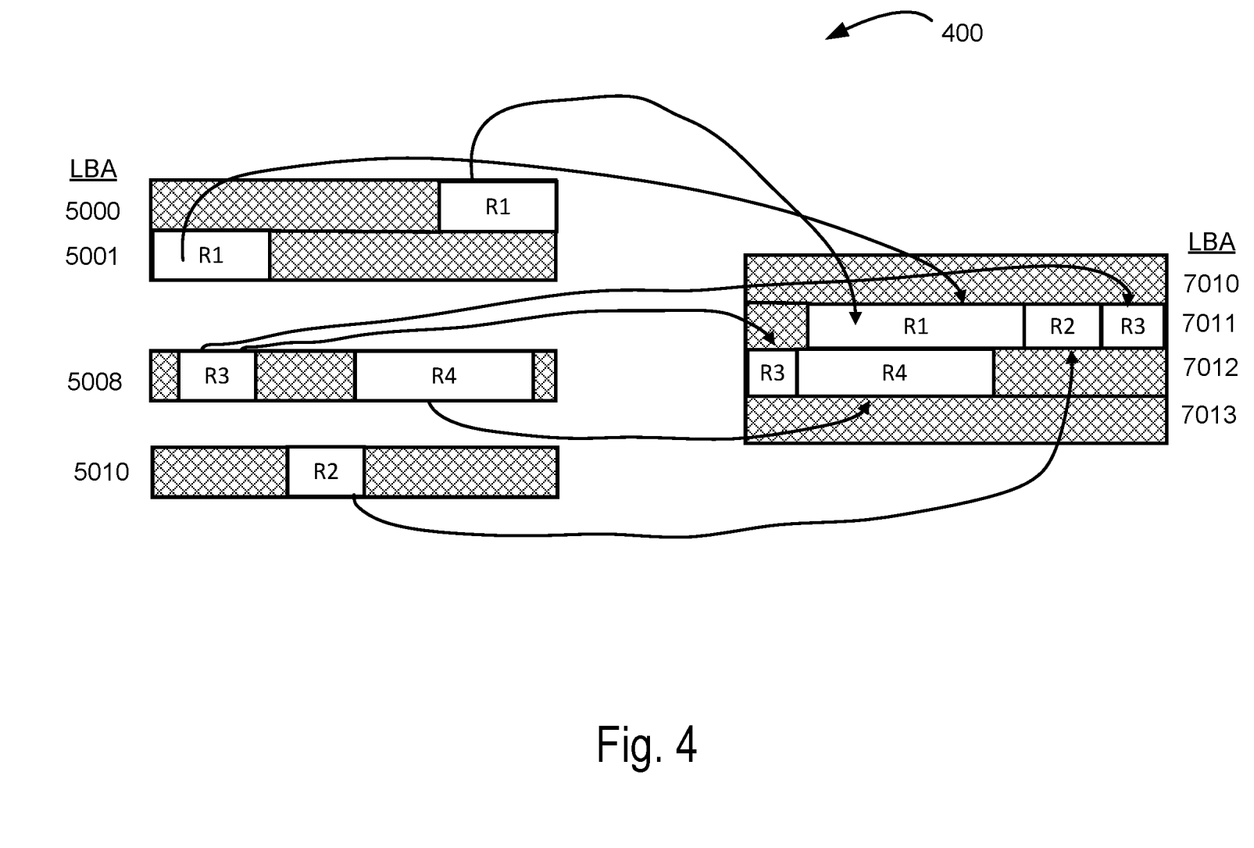
FIG. 4 illustrates a data copy operation, in accordance with various embodiments.

FIG. 4 illustrates a data copy operation 400, in accordance with various embodiments. In some embodiments, the data copy operation 400 may be performed in response to a bytewise copy command such as may be used in a key-value log-structured sort-merge (LSM) compaction operation, in accordance with some embodiments. In various embodiments, the data copy operation 400 may be performed in relation to one or more objects that may be stored in a file. In the data copy operation 400, R1, R3, and R4 represent three variable-sized objects stored in a first file. The gaps between R1 and R3, and between R3 and R4, may represent stale objects that do not need to be relocated. R2 represents an object in a second file. The first and second files are being compacted, which may include merging the objects from the two files, in a sort-order, to a new destination file, while discarding stale objects. For the data copy operation 400 shown, a host determines that the correct order is R1, R2, R3, and R4 for placement of the valid objects in a destination file. To perform the operation, the host issues a bytewise copy command to copy the data, rather than using a legacy approach of reading sectors 5000, 5001, 5008, and 5010 followed by writing sectors 7011 and 7012. In various embodiments, an SSD (e.g., data storage device 100) may perform NAND-level reads and writes in response to the bytewise copy command, but the data may never leave the SSD during compaction.

In the data copy operation 400, the four source ranges are R1-R4, located in portions of logical block addresses (LBAs) 5000, 5001, 5008, and 5010. The data in those ranges is copied to a single destination range that starts within LBA 7011. R1 is shown as being split across sectors in the source but not in the destination, and the opposite is the case for R3.

In various embodiments, a data copy operation (e.g, the data copy operation 400 or the data copy operation discussed with respect to the block 310) may be optimized by treating the source ranges as a collection rather than individually (e.g., R1, R2, and the relevant portion of R3 may be written in a single operation to sector 7011 rather than as three read-modify-write operations). Similarly, if sectors 7011 and 7012 belong to the same IU-granularity physical address/page, then the two may be written with a single write operation in some embodiments.

In some embodiments, one or more flags may be added as parameters that specify, for each destination range, a desired behavior for its beginning and end sectors for the parts of those sectors that are not copy destinations. In various embodiments, the flags may have values of "zero-fill", "do-not-modify/RMW", "don't care", or any other suitable value. For large ranges, this may enable optimizations such as eliminating the need for performing an internal DMA transfer of the destination IU(s) from non-volatile storage to the destination region in volatile memory as discussed with respect to the block 310. Use of flags with respect to the data copy operation 400 may include flags for the destination range that spans sectors 7011 and 7012 that specify that the beginning of the range should be "do-not-modify/RMW" and the end of the range is "don't care".

In some embodiments, the device (e.g., data storage device 100) may impose one or more restrictions to simplify the copy operation while still serving the majority of use-cases. In some embodiments, the device may limit the number of copy operations and/or the number of sectors being copied at any given time to ensure that there are not too many physical addresses "in-copy", to allow normal SSD operations (e.g, relocations) to continue successfully. Similarly, the device may enforce a policy that LBAs being touched by source and destination ranges do not overlap and/or may return an error if they do overlap. In some embodiments, the device may include additional logic to handle such overlap cases.

In some embodiments, peer-to-peer byte range copies may be supported (e.g., by including a destination disk address in the destination ranges). In various embodiments, the peer-to-peer byte range copies may be from one data storage device (e.g., a drive) to another and may be performed in a byte aligned manner without passing through a host.

Figure 5:
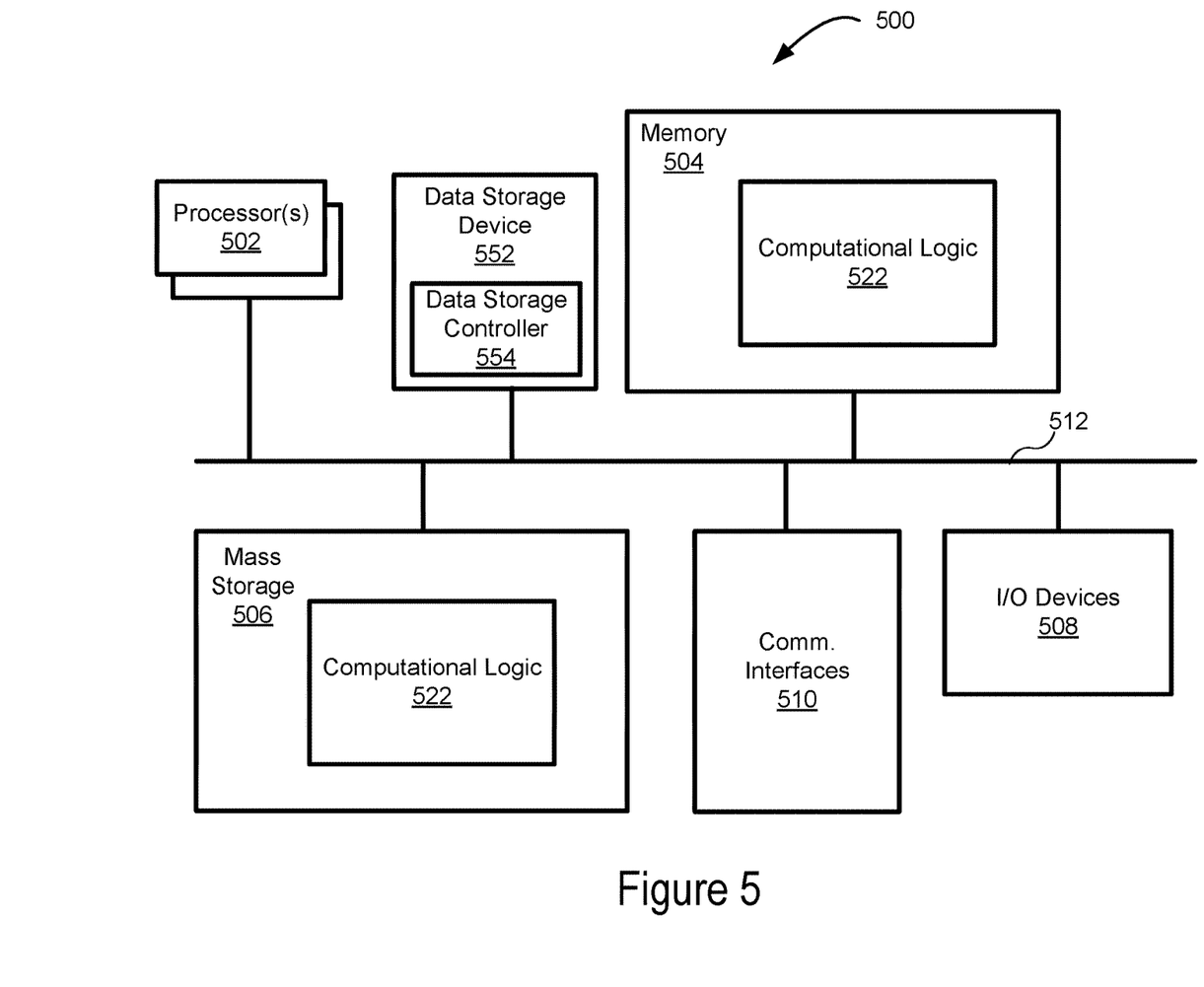
FIG. 5 is a block diagram that schematically illustrates a computing device, in accordance with various embodiments.

FIG. 5 illustrates a block diagram of an example computing device 500 suitable for use with various components of FIGS. 1-2, the technique 300 of FIG. 3, and/or the data copy operation 400 of FIG. 4, in accordance with various embodiments. For example, the computing device 500 may be, or may include or otherwise be coupled to, data storage device 100, data storage controller 102, data storage 110, data copy management module 212, and/or one or more other components shown and/or described with respect to FIGS. 1-2. As shown, computing device 500 may include one or more processors or processor cores 502 and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor. In some embodiments, processors 502, in addition to cores, may further include hardware accelerators, e.g., hardware accelerators implemented with Field Programmable Gate Arrays (FPGA). The computing device 500 may include mass storage devices 506 (such as diskette, hard drive, non-volatile memory (NVM) (e.g., compact disc read-only memory (CD-ROM), digital versatile disk (DVD), any other type of suitable NVM, and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth.

The computing device 500 may further include I/O devices 508 (such as a display (e.g., a touchscreen display), keyboard, cursor control, remote control, gaming controller, image capture device, and so forth) and communication interfaces 510 (such as network interface cards, modems, infrared receivers, radio receivers (e.g., Bluetooth), and so forth), one or more antennas, and/or any other suitable component.

The communication interfaces 510 may include communication chips (not shown) that may be configured to operate the device 500 in accordance with a local area network (LAN) (e.g., Ethernet) and/or a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

In various embodiments, computing device 500 may include a data storage device 552 that may be configured in similar fashion to the data storage device 100 described with respect to FIG. 1 and/or may include an environment configured in similar fashion to the environment 200 described with respect to FIG. 2. In some embodiments, the data storage device 552 may be coupled with other components of the computer device 500. In some embodiments, the data storage device 552 may include a data storage controller 554 that may be configured in similar fashion to the data storage controller 102 described with respect to FIG. 1.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions for the operation of various components of computing device 500, including but not limited to an operating system of computing device 500, one or more applications, and/or operations associated with computing device 500 serving as data storage controller 102, data access management module 202, and/or data copy management module 212, collectively denoted as computational logic 522. The various elements may be implemented by assembler instructions supported by processor(s) 502 or high-level languages that may be compiled into such instructions. In some embodiments, the computing device 500 may be implemented as a fixed function ASIC, a FPGA, or any other suitable device with or without programmability or configuration options.

The permanent copy of the programming instructions may be placed into mass storage devices 506 in the factory, or in the field through, for example, a distribution medium (not shown), such as a compact disc (CD), or through communication interface 510 (from a distribution server (not shown)). That is, one or more distribution media having an implementation of the agent program may be employed to distribute the agent and to program various computing devices.

The number, capability, and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

In some embodiments, data copy management module 212 may be included with computational logic 522 or hardware accelerators of processor 502. For some embodiments, at least one of processors 502 may be packaged together with computational logic 522 configured to practice aspects of embodiments described herein to form a System in Package (SiP) or a System on Chip (SoC).

In various implementations, the computing device 500 may comprise one or more components of a data center, a laptop, a netbook, a notebook, an ultrabook, a smartphone, a tablet, an ultra mobile PC, or a mobile phone. In some embodiments, the computing device 500 include one or more components of a server. In further implementations, the computing device 500 may be any other electronic device that processes data.

Figure 6:
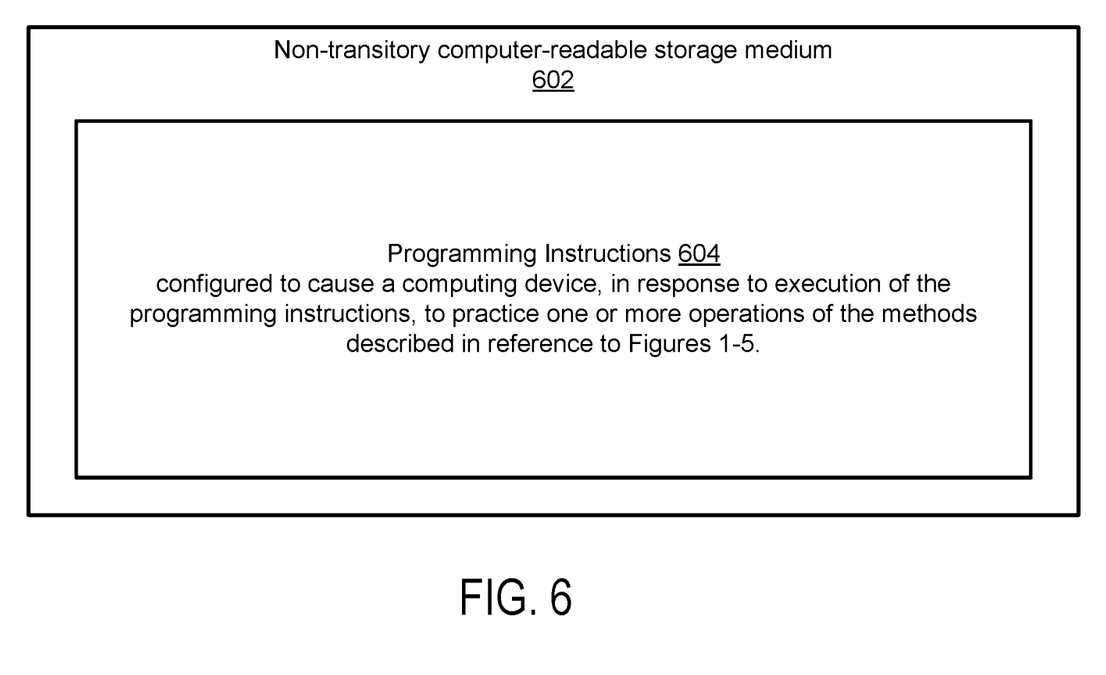
FIG. 6 illustrates an example storage medium with instructions configured to enable an apparatus to practice various aspects of the present disclosure, in accordance with various embodiments.

FIG. 6 illustrates example computer-readable storage medium 602 having instructions configured to practice all or selected ones of the operations associated with the computer device 500, earlier described with respect to FIG. 5; the data storage device 100 and/or the data storage controller 102 described with respect to FIG. 1; the environment 200 described with respect to FIG. 2; the technique 300 of FIG. 3; and/or the data copy operation 400 described with respect to FIG. 4, in accordance with various embodiments. As illustrated, computer-readable storage medium 602 may include a number of programming instructions 604. The storage medium 602 may represent a broad range of non-transitory persistent storage medium known in the art, including but not limited to flash memory, dynamic random access memory, static random access memory, an optical disk, a magnetic disk, etc. Programming instructions 604 may be configured to enable a device, e.g., data storage device 100, data storage controller 102 and/or other components of the data storage device 100, and/or environment 200 in response to execution of the programming instructions 604, to perform, e.g., but not limited to, various operations described for the data storage controller 102, the data access management module 202, the recovery module 204, the data copy management module 212, the computer device 500 of FIG. 5, the data copy operation 400 of FIG. 4, or operations shown and/or described with respect to technique 300 of FIG. 3. In alternate embodiments, programming instructions 604 may be disposed on multiple computer-readable storage media 602. In an alternate embodiment, storage medium 602 may be transitory, e.g., signals encoded with programming instructions 604.

Referring back to FIG. 5, for an embodiment, at least one of processors 502 may be packaged together with memory having all or portions of computational logic 522 configured to practice aspects shown or described for the data storage controller 102 and/or other components of the data storage device 100 shown in FIG. 1, environment 200 of FIG. 2, operations shown or described with respect to technique 300 of FIG. 3, or the data copy operation 400 of FIG. 4. For an embodiment, at least one of processors 502 may be packaged together with memory having all or portions of computational logic 522 configured to practice aspects described for the data storage controller 102 and/or other components of the data storage device 100 shown in FIG. 1, environment 200 of FIG. 2, operations shown or described with respect to technique 300 of FIG. 3, or the data copy operation 400 of FIG. 4 to form a System in Package (SiP). For an embodiment, at least one of processors 502 may be integrated on the same die with memory having all or portions of computational logic 522 configured to practice aspects described for the data storage controller 102 and/or other components of the data storage device 100 shown in FIG. 1, environment 200 of FIG. 2, operations shown or described with respect to technique 300 of FIG. 3, or the data copy operation 400 of FIG. 4. For an embodiment, at least one of processors 502 may be packaged together with memory having all or portions of computational logic 522 configured to practice aspects of the data storage controller 102 and/or other components of the data storage device 100 shown in FIG. 1, environment 200 of FIG. 2, operations shown or described with respect to technique 300 of FIG. 3, or the data copy operation 400 of FIG. 4 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a data storage device comprising: a non-volatile data storage component; a volatile memory; and a data storage controller to: receive a request from a host to perform a data copy operation on the non-volatile data storage component, wherein the request identifies one or more source ranges of the non-volatile data storage component from which data is to be copied, a destination range of the non-volatile data storage component to which the data is to be copied, and a transfer length in bytes for each of the one or more source ranges; and perform the data copy operation to copy the data from the one or more source ranges to the destination range based at least in part on the transfer length in bytes.

Example 2 may include the subject matter of Example 1, wherein the request includes a logical block address (LBA) and a byte offset for each source range and for the destination range.

Example 3 may include the subject matter of any one of Examples 1-2, wherein the request identifies more than one source range.

Example 4 may include the subject matter of any one of Examples 1-3, wherein the non-volatile data storage component is NAND memory in a solid state drive (SSD).

Example 5 may include the subject matter of any one of Examples 1-3, wherein the non-volatile data storage component is a block-based non-volatile data storage component included in a direct-access SSD, a hard disk drive (HDD), a redundant array of independent disks (RAID) array, a 3-D crosspoint (3DXP) based SSD, a network-attached storage (NAS) device, or a storage area network (SAN) device.

Example 6 may include the subject matter of any one of Examples 1-5, wherein the destination range is a first destination range, the request identifies a second destination range, and the request identifies a first destination length in bytes corresponding to the first destination range and a second destination length in bytes corresponding to the second destination range.

Example 7 may include the subject matter of any one of Examples 1-6, wherein the data storage controller is to perform the data copy operation with: a first direct memory access (DMA) transfer of data from the one or more source ranges in the non-volatile data storage component to a first location in the volatile memory; a copy of data from the first location in the volatile memory to a second location in the volatile memory; and a second DMA transfer of data from the second location in the volatile memory to the destination range in the non-volatile data storage component.

Example 8 may include the subject matter of any one of Examples 1-7, wherein the data storage controller is to notify the host that the data copy operation has been completed.

Example 9 may include the subject matter of Example 8, wherein the data storage controller is to notify the host that the data copy operation has been completed before completion of the data copy operation.

Example 10 may include the subject matter of any one of Examples 1-9, wherein the data storage device is a first data storage device, the non-volatile data storage component is a first non-volatile data storage component, the destination range is in a second non-volatile data storage component of a second data storage device, and the data storage controller is to perform the data copy operation to copy the data from the one or more source ranges to the destination range in the second non-volatile data storage component of the second data storage device.

Example 11 may include the subject matter of any one of Examples 1-10, wherein the data storage controller is also to store a copy token in a power-fail-safe data structure, wherein the copy token identifies the one or more source ranges, the transfer length in bytes for each of the one or more source ranges, and the destination range.

Example 12 may include a method for performing a data copy operation on a data storage device, the method comprising: receiving, by a data storage controller of the data storage device, a request to perform a data copy operation on a non-volatile data storage component of the data storage device, wherein the request identifies one or more source ranges of the non-volatile data storage component from which data is to be copied, a transfer length in bytes for each of the one or more source ranges, and a destination range of the non-volatile data storage component to which the data is to be copied; and performing, by the data storage controller, the data copy operation to copy the data from the one or more source ranges to the destination range based at least in part on the transfer length in bytes.

Example 13 may include the subject matter of Example 12, wherein the request includes a logical block address (LBA) and a byte offset for each source range and for the destination range.

Example 14 may include the subject matter of any one of Examples 12-13, wherein the destination range is a first destination range, the request identifies a second destination range, and the request identifies a first destination length in bytes corresponding to the first destination range and a second destination length in bytes corresponding to the second destination range.

Example 15 may include the subject matter of any one of Examples 12-14, wherein the data storage controller is to perform the data copy operation with a read of data from the one or more source ranges in the non-volatile data storage component to a first location in the volatile memory, a copy of data from the first location in the volatile memory to a second location in the volatile memory, and a write of data from the second location in the volatile memory to the destination range in the non-volatile data storage component.

Example 16 may include the subject matter of any one of Examples 12-15, wherein the request is from a host and the data storage controller is to notify the host that the data copy operation has been completed before completion of the data copy operation.

Example 17 may include one or more non-transitory machine-readable media comprising instructions that cause a data storage device, in response to execution of the instructions by the data storage device, to: process a request from a host to perform a data copy operation on a non-volatile storage component of the data storage device, wherein the request identifies one or more source ranges of the non-volatile data storage component from which data is to be copied, a transfer length in bytes for each of the one or more source ranges, and a destination range of the non-volatile data storage component to which the data is to be copied; and perform the data copy operation to copy the data from the one or more source ranges to the destination range based at least in part on the transfer length in bytes.

Example 18 may include the subject matter of Example 17, wherein the request includes a logical block address (LBA) and a byte offset for each source range and for the destination range.

Example 19 may include the subject matter of any one of Examples 17-18, wherein the request identifies more than one source range.

Example 20 may include the subject matter of any one of Examples 17-19, wherein the destination range is a first destination range, the request identifies a second destination range, and the request identifies a first destination length in bytes corresponding to the first destination range and a second destination length in bytes corresponding to the second destination range.

Example 21 may include the subject matter of any one of Examples 17-20, wherein the instructions are also to cause the data storage device to perform the data copy operation with: a first direct memory access (DMA) transfer of data from the one or more source ranges in the non-volatile data storage component to a first location in a volatile memory of the data storage device; a copy of data from the first location in the volatile memory to a second location in the volatile memory; and a second DMA transfer of data from the second location in the volatile memory to the destination range in the non-volatile data storage component.

Example 22 may include the subject matter of any one of Examples 17-21, wherein the instructions are also to cause the data storage device to notify the host that the data copy operation has been completed before completion of the data copy operation.

Example 23 may include the subject matter of any one of Examples 17-22, wherein the data storage device is a first data storage device, the non-volatile data storage component is a first non-volatile data storage component, the destination range is in a second non-volatile data storage component of a second data storage device, and instructions are to cause the data storage device to copy the data from the one or more source ranges to the destination range in the second non-volatile data storage component of the second data storage device.

Example 24 may include the subject matter of any one of Examples 17-23, wherein the request includes an address of an array in a buffer that includes source range parameters, an indication of a number of source ranges, and an indication of a number of destination ranges.

Example 25 may include the subject matter of any one of Examples 17-24, wherein the instructions are also to cause the data storage device to store a copy token in a power-fail-safe data structure, wherein the copy token identifies the one or more source ranges, the transfer length in bytes for each of the one or more source ranges, and the destination range.

Example 26 may include a data storage device comprising: means for storing data, wherein the means for storing data is to store the data in a non-volatile manner; means for receiving a request from a host to perform a data copy operation on the means for storing data, wherein the request identifies one or more source ranges of the means for storing data from which data is to be copied, a destination range of the means for storing data to which the data is to be copied, and a transfer length in bytes for each of the one or more source ranges; and means for performing the data copy operation to copy the data from the one or more source ranges to the destination range based at least in part on the transfer length in bytes.

Example 27 may include the subject matter of Example 26, wherein the request includes a logical block address (LBA) and a byte offset for each source range and for the destination range.

Example 28 may include the subject matter of any one of Examples 26-27, wherein the request identifies more than one source range.

Example 29 may include the subject matter of any one of Examples 26-28, wherein the destination range is a first destination range, the request identifies a second destination range, and the request identifies a first destination length in bytes corresponding to the first destination range and a second destination length in bytes corresponding to the second destination range.

Example 30 may include the subject matter of any one of Examples 26-29, wherein the means for performing the data copy operation includes means for performing a first transfer of data from the one or more source ranges in the means for storing data to a first location in a volatile memory; means for copying data from the first location in the volatile memory to a second location in the volatile memory; and means for performing a second transfer of data from the second location in the volatile memory to the destination range in the means for storing data.

Example 31 may include the subject matter of any one of Examples 26-30, further including means for notifying the host that the data copy operation has been completed before completion of the data copy operation.

Example 32 may include the subject matter of any one of Examples 26-31, further including means for storing a copy token in a power-fail-safe data structure, wherein the copy token identifies the one or more source ranges, the transfer length in bytes for each of the one or more source ranges, and the destination range.

Example 33 may include a system comprising: a host; and a data storage device in data communication with the host, wherein the data storage device includes a non-volatile data storage component; a volatile memory; and a data storage controller to: receive a request from the host to perform a data copy operation on the non-volatile data storage component, wherein the request identifies one or more source ranges of the non-volatile data storage component from which data is to be copied, a destination range of the non-volatile data storage component to which the data is to be copied, and a transfer length in bytes for each of the one or more source ranges; and perform the data copy operation to copy the data from the one or more source ranges to the destination range based at least in part on the transfer length in bytes.

Example 34 may include the subject matter of Example 33, further including a processor coupled with the data storage device, and one or more of a display or an antenna coupled with the processor.

Example 35 may include a data storage controller comprising: a host interface to receive a request from a host to perform a data copy operation on a non-volatile data storage component of a data storage device, wherein the request identifies one or more source ranges of the non-volatile data storage component from which data is to be copied, a destination range of the non-volatile data storage component to which the data is to be copied, and a transfer length in bytes for each of the one or more source ranges; and a processor coupled with the host interface to process the request from the host to perform the data copy operation to copy the data from the one or more source ranges to the destination range based at least in part on the transfer length in bytes.

Example 36 may include the subject matter of Example 35, wherein the request includes a logical block address (LBA) and a byte offset for each source range and for the destination range.

Example 37 may include the subject matter of any one of Examples 35-36, wherein the request identifies more than one source range.

Example 38 may include the subject matter of any one of Examples 35-37, wherein the destination range is a first destination range, the request identifies a second destination range, and the request identifies a first destination length in bytes corresponding to the first destination range and a second destination length in bytes corresponding to the second destination range.

Example 39 may include the subject matter of any one of Examples 35-38, wherein the processor is to perform the data copy operation with: a first direct memory access (DMA) transfer of data from the one or more source ranges in the non-volatile data storage component to a first location in a volatile memory of the data storage device; a copy of data from the first location in the volatile memory to a second location in the volatile memory; and a second DMA transfer of data from the second location in the volatile memory to the destination range in the non-volatile data storage component.

Example 40 may include the subject matter of any one of Examples 35-39, wherein the processor is also to notify the host that the data copy operation has been completed before completion of the data copy operation.

Example 41 may include the subject matter of any one of Examples 35-40, wherein the data storage device is a first data storage device, the non-volatile data storage component is a first non-volatile data storage component, the destination range is in a second non-volatile data storage component of a second data storage device, and processor is to copy the data from the one or more source ranges to the destination range in the second non-volatile data storage component of the second data storage device.

Example 42 may include the subject matter of any one of Examples 35-41, wherein the request includes an address of an array in a buffer that includes source range parameters, an indication of a number of source ranges, and an indication of a number of destination ranges.

Example 43 may include the subject matter of any one of Examples 35-42, wherein the processor is to store a copy token in a power-fail-safe data structure, wherein the copy token identifies the one or more source ranges, the transfer length in bytes for each of the one or more source ranges, and the destination range.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions stored thereon that, when executed, result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. A data storage controller comprising:
a host interface to receive a request from a host to perform a data copy operation on a non-volatile data storage component of a data storage device that comprises a key-value (KV) storage system, wherein the request identifies one or more source ranges of the non-volatile data storage component from which data is to be copied, a destination range of the non-volatile data storage component to which the data is to be copied, and a transfer length in bytes for each of the one or more source ranges; and
a processor coupled with the host interface to:
upon receiving the request, notify the host that the data copy operation has been completed before performance of the data copy operation, to allow the host to proceed with performance of other tasks during the performance of the data copy operation; and
after the notification, perform the data copy operation to copy the data from the one or more source ranges to the destination range based at least in part on the transfer length in bytes, freeing the host to proceed with performance of the other tasks during the performance of the data copy operation.

2. The data storage controller of claim 1, wherein the request includes a logical block address (LBA) and a byte offset for each source range and for the destination range.

3. The data storage controller of claim 1, wherein the request identifies more than one source range.

4. The data storage controller of claim 1, wherein the destination range is a first destination range, the request identifies a second destination range, and the request identifies a first destination length in bytes corresponding to the first destination range and a second destination length in bytes corresponding to the second destination range.

5. The data storage controller of claim 1, wherein the processor is to perform the data copy operation with:
a first direct memory access (DMA) transfer of data from the one or more source ranges in the non-volatile data storage component to a first location in a volatile memory of the data storage device;

a copy of data from the first location in the volatile memory to a second location in the volatile memory; and a second DMA transfer of data from the second location in the volatile memory to the destination range in the non-volatile data storage component.

6. The data storage controller of claim 1, wherein the data storage device is a first data storage device, the non-volatile data storage component is a first non-volatile data storage component, the destination range is in a second non-volatile data storage component of a second data storage device, and the processor is to copy the data from the one or more source ranges to the destination range in the second non-volatile data storage component of the second data storage device.

7. The data storage controller of claim 1, wherein the request includes an address of an array in a buffer that includes source range parameters, an indication of a number of source ranges, and an indication of a number of destination ranges.

8. The data storage controller of claim 1, wherein the processor is to store a copy token in a power-fail-safe data structure, wherein the copy token identifies the one or more source ranges, the transfer length in bytes for each of the one or more source ranges, and the destination range.

9. A data storage device comprising:
a non-volatile data storage component;
a volatile memory; and
a data storage controller to:
receive a request from a host to perform a data copy operation on the non-volatile data storage component, wherein the request identifies one or more source ranges of the non-volatile data storage component from which data is to be copied, a destination range of the non-volatile data storage component to which the data is to be copied, and a transfer length in bytes for each of the one or more source ranges;
upon receiving the request, notify the host that the data copy operation has been completed before performance of the data copy operation, to allow the host to proceed with performance of other tasks during the performance of the data copy operation; and
after the notification, perform the data copy operation to copy the data from the one or more source ranges to the destination range based at least in part on the transfer length in bytes, freeing the host to proceed with performance of the other tasks during the performance of the data copy operation.

10. The data storage device of claim 9, wherein the request includes a logical block address (LBA) and a byte offset for each source range and for the destination range.

11. The data storage device of claim 9, wherein the request identifies more than one source range.

12. The data storage device of claim 9, wherein the non-volatile data storage component is NAND memory in a solid state drive (SSD).

13. The data storage device of claim 9, wherein the non-volatile data storage component is a block-based non-volatile data storage component included in a direct-access SSD, a hard disk drive (HDD), a redundant array of independent disks (RAID) array, a 3-D crosspoint (3DXP) based SSD, a network-attached storage (NAS) device, or a storage area network (SAN) device.

14. The data storage device of claim 9, wherein the destination range is a first destination range, the request identifies a second destination range, and the request identifies a first destination length in bytes corresponding to the first destination range and a second destination length in bytes corresponding to the second destination range.

15. The data storage device of claim 9, wherein the data storage controller is to perform the data copy operation with:
a first direct memory access (DMA) transfer of data from the one or more source ranges in the non-volatile data storage component to a first location in the volatile memory;
a copy of data from the first location in the volatile memory to a second location in the volatile memory; and
a second DMA transfer of data from the second location in the volatile memory to the destination range in the non-volatile data storage component.

16. The data storage device of claim 9, wherein the data storage device is a first data storage device, the non-volatile data storage component is a first non-volatile data storage component, the destination range is in a second non-volatile data storage component of a second data storage device, and the data storage controller is to perform the data copy operation to copy the data from the one or more source ranges to the destination range in the second non-volatile data storage component of the second data storage device.

17. The data storage device of claim 9, wherein the data storage controller is also to store a copy token in a power-fail-safe data structure, wherein the copy token identifies the one or more source ranges, the transfer length in bytes for each of the one or more source ranges, and the destination range.

18. A method for performing a data copy operation on a data storage device, the method comprising:
receiving, by a data storage controller of the data storage device, a request from a host to perform a data copy operation on a non-volatile data storage component of the data storage device, wherein the request identifies one or more source ranges of the non-volatile data storage component from which data is to be copied, a transfer length in bytes for each of the one or more source ranges, and a destination range of the non-volatile data storage component to which the data is to be copied;
upon receiving the request, notifying the host, by the data storage controller, that the data copy operation has been completed before performance of the data copy operation, to allow the host to proceed with performance of other tasks during the performance of the data copy operation; and
after the notifying, performing, by the data storage controller, the data copy operation to copy the data from the one or more source ranges to the destination range based at least in part on the transfer length in bytes, freeing the host to proceed with performance of the other tasks during the performance of the data copy operation.

19. The method of claim 18, wherein the request includes a logical block address (LBA) and a byte offset for each source range and for the destination range.

20. The method of claim 18, wherein the destination range is a first destination range, the request identifies a second destination range, and the request identifies a first destination length in bytes corresponding to the first destination range and a second destination length in bytes corresponding to the second destination range.

21. The method of claim 18, wherein the data storage controller is to perform the data copy operation with a read of data from the one or more source ranges in the non-volatile data storage component to a first location in a volatile memory, a copy of data from the first location in the volatile memory to a second location in the volatile memory, and a write of data from the second location in the volatile memory to the destination range in the non-volatile data storage component.

* * * * *